United States Patent [19]
Mizelle

[11] 3,986,218
[45] Oct. 19, 1976

[54] REVERSIBLE SETTEE-BED FOR A DINETTE OF A RECREATIONAL VEHICLE

[75] Inventor: Ned W. Mizelle, High Point, N.C.

[73] Assignee: Master Mfg. & Equip. Co., Inc., Litchfield, Ill.

[22] Filed: June 11, 1975

[21] Appl. No.: 585,965

[52] U.S. Cl. .......................................... 5/43; 5/45
[51] Int. Cl.² ................. A47C 1/032; A47C 17/16
[58] Field of Search ......................... 5/9, 10, 24–26, 5/43, 45, 47; 297/92, 95, 102, 103, 113, 365

[56] References Cited
UNITED STATES PATENTS

| 880,278 | 2/1908 | Coopersmith et al. | 5/45 |
|---|---|---|---|
| 2,574,798 | 7/1950 | Rowe | 297/95 |
| 2,738,829 | 3/1956 | Rowe | 297/95 |
| 3,800,337 | 4/1974 | Mizelle | 5/45 |

*Primary Examiner*—Casmir A. Nunberg
*Attorney, Agent, or Firm*—Wegner, Stellman, McCord, Wiles & Wood

[57] ABSTRACT

A convertible settee-bed iss particularly designed for use in motor homes and other recreational vehicles, and especially as the forward settee of a motor home dinette unit which has two settees facing each other with both back rests arranged for about 275° roll-over movement from facing settee positions to abutting horizontal bed positions coplanar with each other and with the seats. A locking arm pivoted on a fixed base and a spring loaded, digitally manipulable latch button on the back rest cooperate to lock the back rest either in a rearwardly facing dinette position or in a forwardly facing riding position.

12 Claims, 8 Drawing Figures

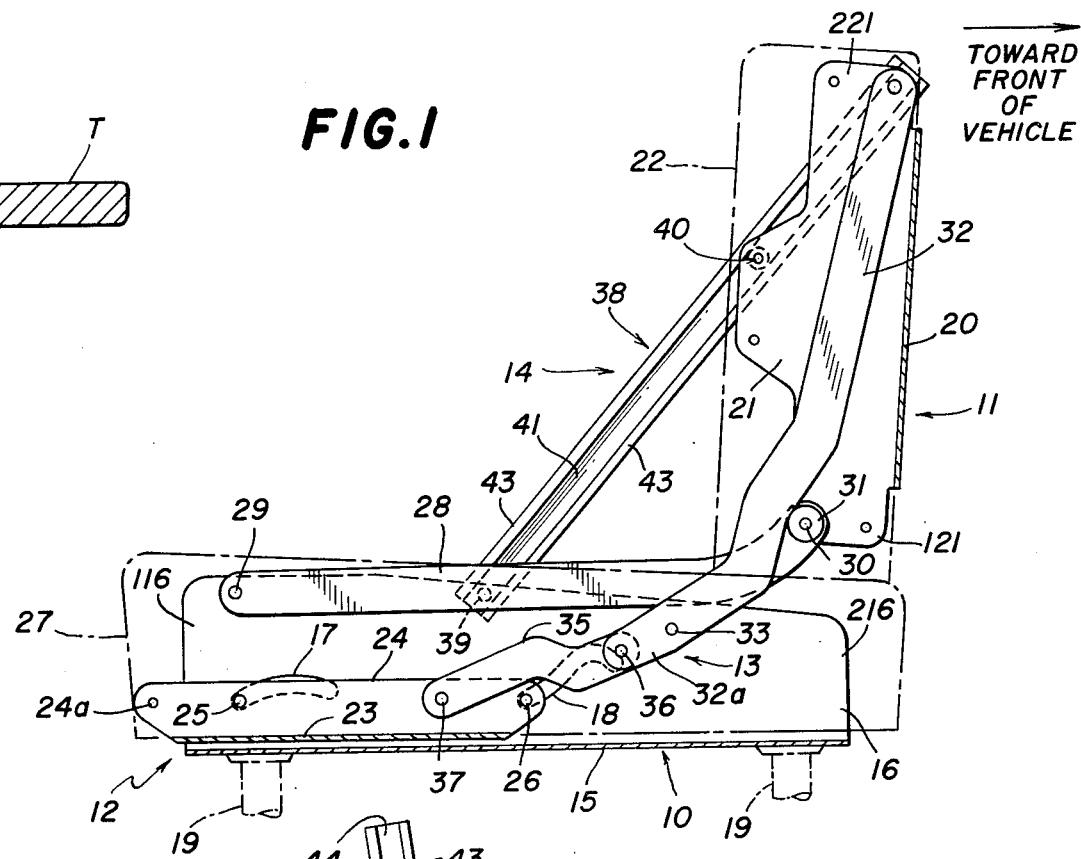
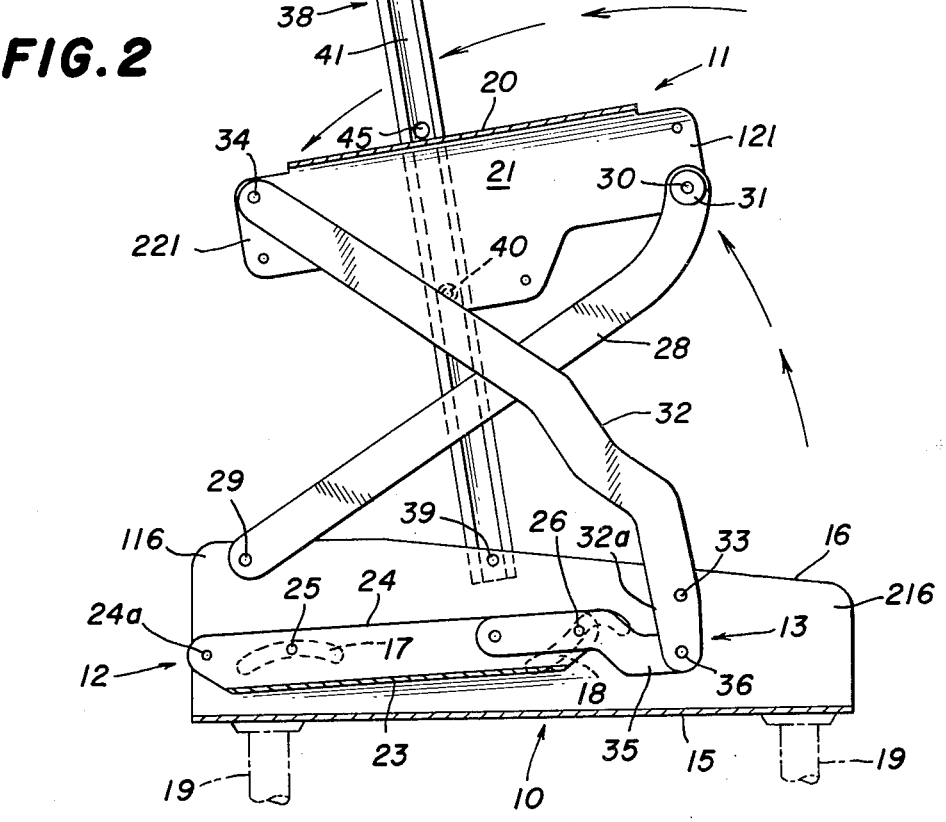
FIG.1
FIG.2

TOWARD FRONT OF VEHICLE →

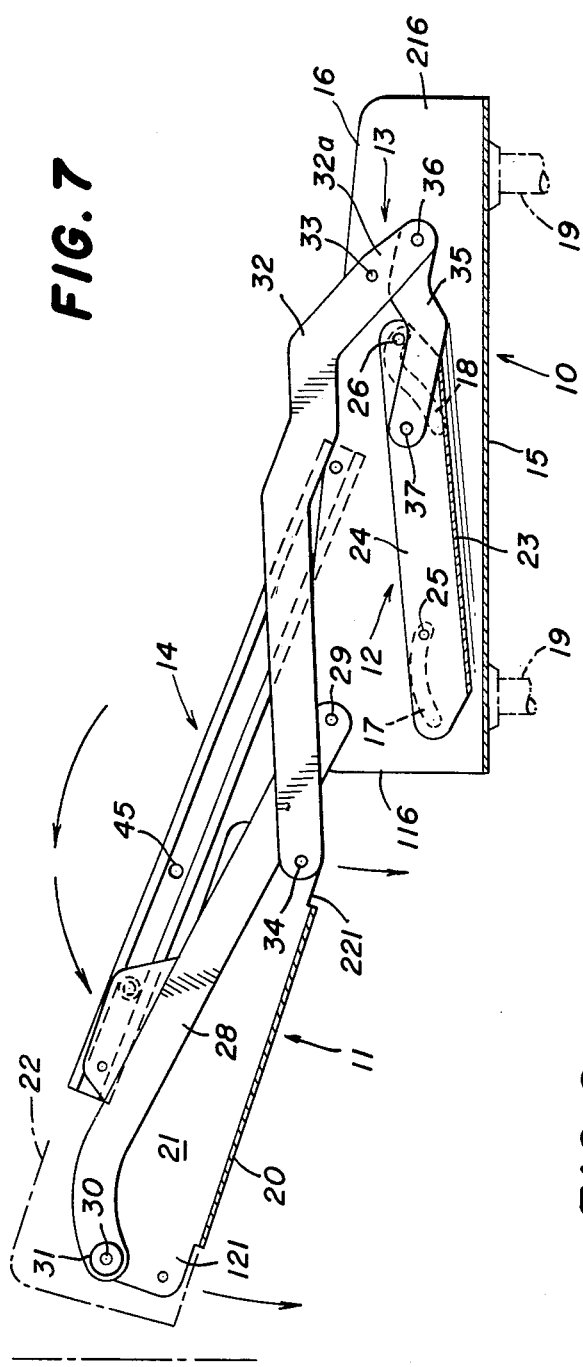
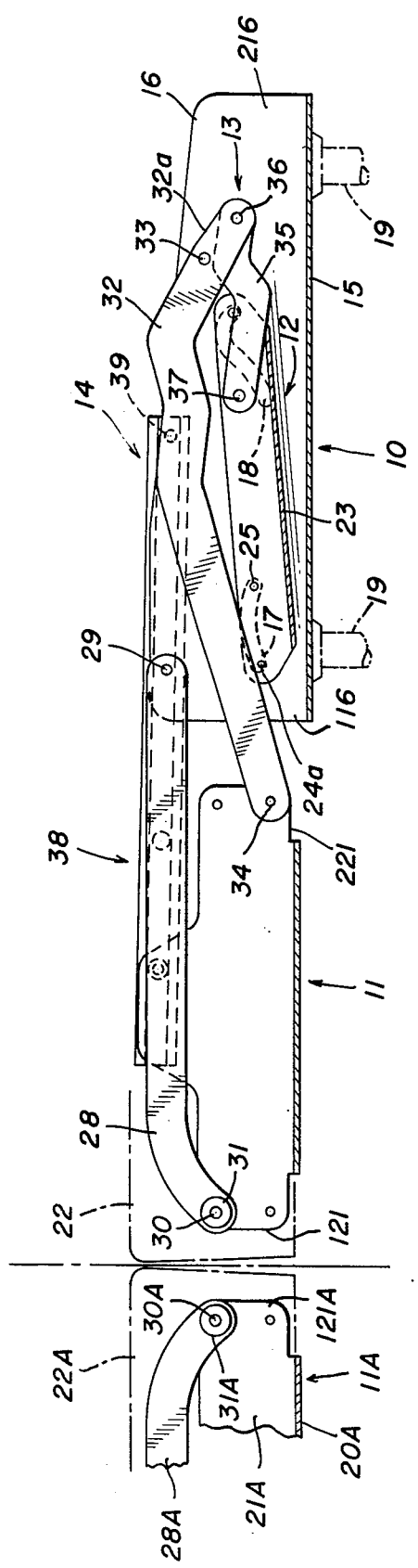
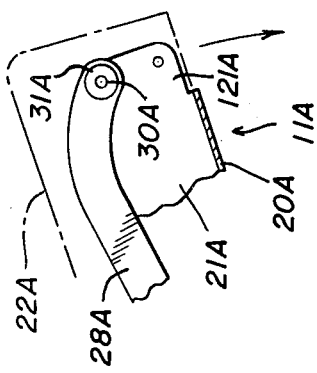

REVERSIBLE SETTEE-BED FOR A DINETTE OF A RECREATIONAL VEHICLE

BACKGROUND OF THE INVENTION

A difficulty with motor homes is a shortage of well located, forwardly facing seats in which passengers may ride safely when a motor home is on the highway. Commonly, a motor home has a dinette unit at one side in which two settees face each other with a table between, and has a long settee extending entirely across the rear. The rearwardly facing settee of the dinette unit is usually fairly close to the front of the vehicle, but is not a desirable passenger seat when the vehicle is on the highway, partly because most people prefer not to ride backward, and also because a rearwardly facing seat is dangerous in case of accident unless it has a high head rest to minimize the possibility of neck injury in case of a sudden stop or forward end collision. Both settees of the dinette unit are hazardous when the vehicle is on the highway because of the table between which can cause severe injury to a rearwardly facing passenger in the case of a rear end collision or to a forwardly facing passenger in the case of a front end collision or a sudden stop. The settee at the rear of the vehicle is a hazardous place to ride unless it is supplied with seat belts, and in addition it is behind the rear axle where the weight of passengers badly disturbs the balance of the vehicle and makes for bad handling.

U.S. Pat. No. 3,800,337 discloses linkage mounted convertible settees for recreational vehicles which may be used either in the dinette unit or as the rear settee of a motor home or other recreational vehicle, but the structure there disclosed does not meet the problem of providing seats which are suitable for passenger use when the vehicle is on the highway.

U.S. Pat. Nos. 2,514,798 and 2,738,829 disclose structures which are defined as "Reversible or Berthable Seat". The structure and mode of operation of the seats of both patents is totally different from that of the present apparatus.

U.S. Pat. No. 3,844,608 discloses a "Mobile Home Lounge" in which two facing seats may be converted to form a bed, and in which one of the two seats has a reversible back rest; but again the structure and mode of operation are totally different from that of the present invention.

SUMMARY OF THE INVENTION

The structure of the present invention constitutes an improvement upon that of U.S. Pat. No. 3,800,337, and in particular the structure of FIGS. 9 to 12 of that patent. In particular, the improvement comprises a latch arm pivotally mounted on the fixed base and a cooperating spring loaded latch button on the back rest which fixes the back rest either in a first settee position or in a second, reversed settee position. The latch button may be depressed by finger pressure to release the locking arm for movement of the back rest between the aforesaid two settee positions and a horizontal bed position.

When the back rest is moved between its three positions, the seat moves slightly fore and aft, and its pitch is changed as required for comfortable seating in both positions and also to put it into a horizontal bed position.

The principal object of the invention, therefore, is to provide an improved convertible settee-bed for recreational vehicles, and particularly for motor homes, which provides either a rearwardly facing forward seat for a dinette unit or a forwardly facing passenger seat, and which may also be converted into a bed in cooperation with the forwardly facing seat of the dinette unit.

Another object of the invention is to provide a reversible settee which provides comfortable seating in either of its two oppositely facing settee positions.

Yet another object of the invention is to provide a reversible, convertible settee mechanism which utilizes a simple, rugged linkage mechanism for moving the back rest and cushion seat of the settee between their three positions.

THE DRAWINGS

FIG. 1 is a sectional view of the apparatus of the invention with the cushion seat and back rest illustrated in broken lines and with the back rest in dinette position;

FIG. 2 is a sectional view similar to FIG. 1 with the back rest in an intermediate position between the dinette position and the riding position;

FIG. 7 illustrates the unit with its back rest approaching bed position, and illustrates the relationship between the back rests of the two settee units as both approach bed position, the forward portions of the back cushions being illustrated in broken lines; and FIG. 8 is a view similar to FIG. 7 with the back rests in bed position.

DETAILED DESCRIPTION OF THE INVENTION

Figure 3:
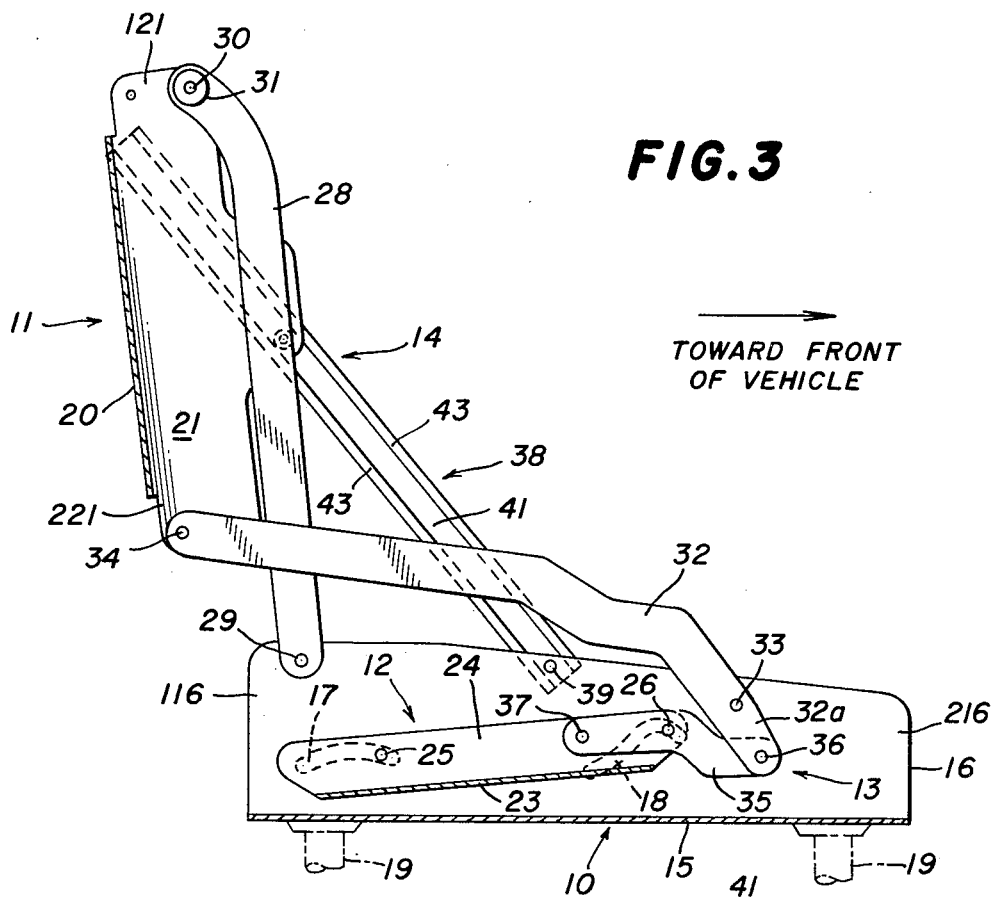
FIG. 3 is a view similar to FIGS. 1 and 2 with the back rest in riding position.

Referring first to FIG. 1, the apparatus includes a base, indicated generally at 10; a back rest, indicated generally at 11; a seat, indicated generally at 12; a control linkage, indicated generally at 13; and locking means, indicated generally at 14. It is to be understood that FIGS. 1, 2, 3, 7 and 8 are sectional views looking toward one end of the mechanism, and that the base 10, back rest 11 and seat 12 extend from end to end and are provided at both ends with control linkages 13. Locking mechanisms 14 may be provided at one or both ends.

Figure 4:
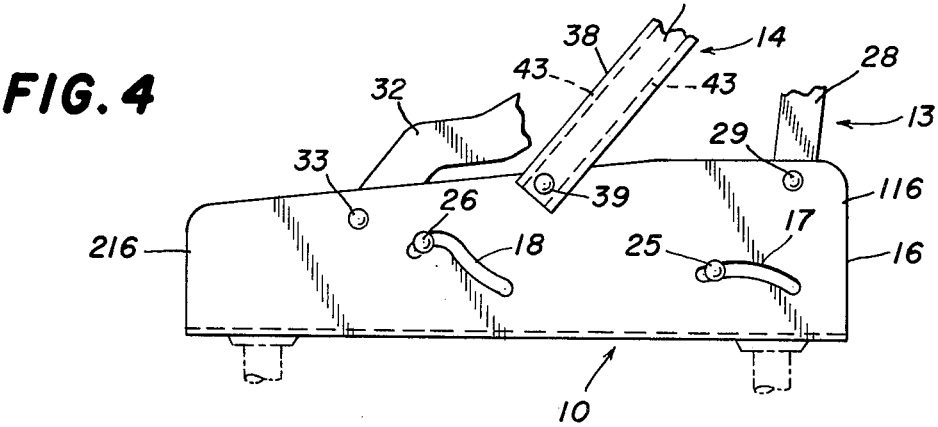
FIG. 4 is a fragmentary side elevational view of the apparatus with the parts in the position of FIG. 3.
Figure 5:
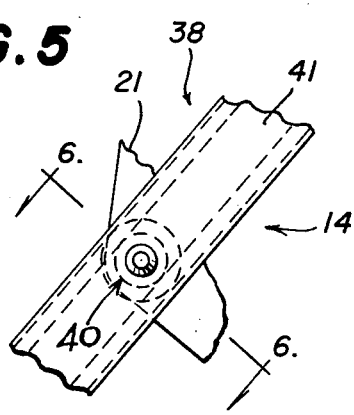
FIG. 5 is a fragmentary side elevational view on an enlarged scale showing the locking arm and latch button in the positions of FIG. 3 but taken from the same side as FIG. 4.

The base 10 includes a bottom plate 15 which extends from end to end of the settee and has upstanding end plates 16; and as best seen in FIG. 4 each of the end plates 16 is provided with an arcuate slot 17 and with a hook-like slot 18. Supports for the base 10 may be of any desired type such, for example, as tubular legs which are illustrated in broken lines in the drawings.

The back rest 11 has a longitudinal plate 20 which has identical end plates 21 at its two ends. The back plate 20 and end plates 21 carry an upholstered back cushion which is indicated in broken lines at 22.

The seat 12 comprises a bottom plate 23 and end plates 24; and on each of the end plates are external headed studs 25 and 26 which support the seat in the arcuate slots 17 and in the hook-like slots 18, respectively. The bottom plate 23 and end plates 24 of the seat carry a cushioned seat structure which is illustrated in broken lines at 27.

The control linkage 13 includes a first link 28 which is pivotally connected at 29 near a first extremity 116 of the base end plate 16, and which is pivoted at 30 to a first extremity 121 of the back rest end plate 21. The pivot 30 includes an enlarged nylon bushing 31 which has a portion that serves as a spacer between the first control link 28 and the back rest end plate 21. The control linkage 13 also includes a second control link 32 which is pivoted at 33 near a second extremity 216 of the base end plate 16, and which is pivoted at 34 to a second extremity 221 of the back rest end plate 21. As seen in FIG. 1, the bushing 31 also provides a stop for the link 32 when the apparatus is in the settee position of FIG. 1.

The base 10, and back rest 11, and the first and second control links 28 and 32 form a four bar linkage in which the base is a fixed link and the movement of the back rest is controlled by the movable control links 28 and 32 which guide the back rest from the dinette position of FIG. 1 through the position of FIG. 2 to the riding position of FIG. 3, and then on through the position of FIG. 7 to the bed position of FIG. 8, where the links 32 rest on internal studs 24a of the seat end plates 24.

The control linkage 13 also includes a seat control link 35 which is pivotally connected at 36 to an extension 32a of the second control link 32 below its pivot 33, and which is also pivotally connected to the seat end plate 24 at 37. A comparison of FIGS. 1, 2, 3, 4, 7 and 8 shows that as the back rest 11 is moved between the various illustrated positions, the links 35 cause the seat mounting studs 25 and 26 to move in the arcuate slots 17 and in the hook-like slots 18 to change the pitch of the seat cushion 27 and also to move the seat cushion from a dinette position in which it extends beyond the extremity 116 of the base end plate 16 to a bed position in which it is substantially in the same vertical plane as said extremity 116. As best seen in FIG. 1, the seat cushion 27 is thicker near the extremity 116 of the base than it is near the extremity 216, so that with the seat plate 23 in the horizontal position that it assumes in dinette position, the seat cushion 27 has a comfortable rearward pitch. In the bed position of FIG. 8 when the pins 25 and 26 are at the opposite ends of the slots 17 and 18, the seat plate 23 is at such an angle that the top surface of the seat cushion 27 is horizontal and coplanar with the top of the back cushion 22. In the forwardly facing riding position of FIG. 3, there is a very slight pitch of the seat cushion 27 in the direction of the back rest.

In the dinette position of FIG. 1, a table T is conveniently positioned with reference to the settee back rest 11 and seat 12; and when the back rest is moved to the riding position of FIG. 3 it substantially abuts the table T unless the latter has first been removed as is done before the back rest 11 is moved to the bed position of FIG. 8 where the back cushion 22 abuts witth a back cushion 22A on a second back rest 11A which is seen in FIGS. 7 and 8.

Figure 6:
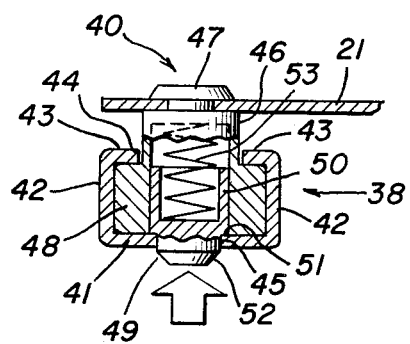
FIG. 6 is a fragmentary sectional view on an enlarged scale taken substantially as indicated along the line 6—6 of FIG. 5.

The locking mechanism 14 includes a locking arm, indicated generally at 38, which is pivoted at 39 on the base end plate 16; and a spring loaded push button assembly, indicated generally at 40, which is mounted upon the back rest end plate 21 and which is best seen in FIG. 6.

As best seen in FIG. 6, the locking arm 38 has a cross section which is in the form of a hollow rectangle, so that it has a longitudinal web 41, parallel flanges 42 flanking the web 41, and overhanging lips 43 which are parallel to the web 41 and define the sides of a slot 44 that extends from end to end of the locking arm 38 opposite the web 41. In the web 41 is a hole 45 which is aligned with the spring loaded push button assembly 40 when the back rest 11 is in the dinette position of FIG. 1 and when the back rest is in the riding position of FIG. 3.

Referring again to FIG. 6, the spring loaded push button assembly 40 includes a hollow base 46 which has an integral end portion that provides a rivet 47 by means of which the push button assembly is mounted on the back rest end plate 21 with the shank of the rivet 47 impaling a hole in said end plate 21. The hollow base 46 has an enlarged free end portion 48 which is slidably received in the channel which is defined by the web 41, the flanges 42 and the lips 43; and as seen by a comparison of the various views, the locking arm 14 is long enough that the base 46 and enlarged head 48 of the push button assembly 40 remain within the locking arm channel at all times.

The spring loaded push button assembly also includes a push button 49 which has a hollow body 50 slidably received in the enlarged head 48 of the base 46; and the hollow body 50 has a shoulder 51 which bears against the web 41 surrounding the hole 45 so that the push button 49 which has a chamfered extremity 52 may project through the hole 45 by reason of the urging of a compression spring 53 which is mounted in the spring cavity that is defined by the hollow base 46 and the hollow push button body 50.

When the extremity 52 of the push button is engaged in the hole 45 it cooperates with the locking arm 38 to retain the back rest 11 in the dinette position of FIG. 1 or in the riding position of FIG. 3, as the case may be. When it is desired to move the back rest 11 from either of said positions it is necessary only to depress the push button 49 with a finger as indicated in FIG. 6, while the back rest is urged with the other hand in the direction that it is to move, and as soon as the push button clears the web 41, its outer extremity may slide along the web as the back rest is moved from one position to another.

The foregoing detailed description is given for clearness of understanding only and no unnecessary limitations should be understood therefrom as modifications will be obvious to those skilled in the art.

I claim:

1. In a settee-bed of the type which has a base frame that includes a fixed link of a four bar linkage, a cushioned seat, a cushioned back rest which is a shiftable link of said linkage, and first and second control links at each end of the base frame which connect the back rest to the base frame for about 275° roll-over movement between a generally upright cushion-forward settee position behind the seat and a horizontal cushion-up bed position forward of the seat, the improvement comprising:

a locking arm pivotally mounted on an end of the base frame, means on an end of the back rest which slidably engages said locking arm throughout the movement of the back rest between settee position and bed position, and means for fixing said last named means to said locking arm when the back rest is in a reversed settee position which is intermediate between settee position and bed position.

2. The settee-bed of claim 1 in which the means for fixing said last named means to the locking arm also does so when the back rest is in settee position.

3. The settee-bed of claim 2 in which the locking arm has a web with a hole intermediate the ends of the arm, in which the means on the back rest comprises a stud that has a free end adjacent the web, and the means for fixing the stud to the locking arm comprises a spring loaded latch button on the free end of the stud which protrudes into the hole in the web when the back rest is in both settee positions, said latch button being axially movable by finger pressure to free it from said hole and thereby permit movement of the back rest with the button bearing on the web.

4. The settee-bed of claim 3 in which the locking arm has parallel flanges flanking the web which confine the stud laterally.

5. The settee-bed of claim 4 in which the locking arm has continuous lips on the parallel flanges that overhang the web, and in which the stud has an enlarged free end portion confined between said lips and the web.

6. The settee-bed of claim 1 in which the locking arm has a web with a hole intermediate the ends of the arm, in which the means on the back rest comprises a stud that has a free end adjacent the web, and the means for fixing the stud to the locking arm comprises a spring loaded latch button on the free end of the stud which protrudes into the hole in the web when the back rest is in said reversed settee position, said latch button being axially movable by finger pressure to free it from said hole and thereby permit movement of the back rest with the button bearing on the web.

7. The settee-bed of claim 1 which includes a seat frame, pin and slot means mounting the seat frame on the ends of the base frame for fore-and-aft movement, and a link connecting each end of said seat frame with one of the control links to impart fore-and-aft movement to the seat frame as the back frame moves between settee position and bed position.

8. The settee-bed of claim 7 in which the slots of the pin and slot means are arcuate and change the pitch of the seat between settee position and bed position.

9. A settee-bed comprising, in combination:
a base frame which has end plates provided with aligned pairs of arcuate slots which have substantially coplanar lower ends with the slots of one pair having upper ends substantially above those of the other pair;
a seat frame which has end plates provided with pins in said slots;
a back rest which has end plates;
a set of control links at each end of the base frame, each of said sets comprising a first control link which is pivoted near a first extremity of the base frame end plate and near a first extremity of the back rest end plate and a second control link which is pivoted near a second extremity of the base end plate and near a second extremity of the back rest end plate, said control links mounting the back rest for about 275° roll-over movement between a first settee position in which it is upright adjacent said second extremity of the base frame end plate with said second extremity of the back frame end plate uppermost, and a horizontal bed position with said second extremity of the back frame end plate adjacent the first extremity of the base frame end plate;
and seat frame actuating links operatively connecting said second control links to the seat frame so that movement of the back frame moves the seat frame pins in the slots to change the pitch of the seat frame.

10. The settee-bed of claim 9 in which the back rest, while moving between settee position and bed position, assumes an upright position with the second extremity of its end plate lowermost and adjacent the first extremity of the base frame end plate, and which includes means for locking the back rest in either of said upright positions so that said settee may face in either direction.

11. The settee bed of claim 10 in which the means for locking the back rest in either of said upright positions comprises a locking arm pivotally mounted on a base frame end plate, means on a back rest end plate which slidably engages said locking arm throughout the movement of the back rest between the first settee position and the bed position, and means for fixing said last named means to said locking arm in each of said two upright positions.

12. The settee-bed of claim 9 in which each second control link has an extension beyond its pivotal connection to the base end plate, and the seat frame actuating links are connected to said extensions.

* * * * *